United States Patent [19]

Towery et al.

[11] Patent Number: 5,574,832
[45] Date of Patent: Nov. 12, 1996

[54] DOUBLE AXIS DOT DEPLETION FOR 600 DPI EDGE ACUITY WITH 300 DPI PRINT CARTRIDGE

[75] Inventors: David C. Towery; Alan E. Cariffe; Janet E. Mebane, all of San Diego; Anne P. Kadonaga, Del Mar, all of Calif.; Iue-Shuenn Chen, Singapore, Singapore; Mark Overton, Escondido, Calif.

[73] Assignee: Hewlett-Packard Corporation, Palo Alto, Calif.

[21] Appl. No.: 56,244

[22] Filed: Apr. 30, 1993

Related U.S. Application Data

[63] Continuation-in-part of Ser. No. 925,723, Aug. 3, 1992, abandoned.

[51] Int. Cl.⁶ .................................................. G06K 15/00
[52] U.S. Cl. ........................... 395/109; 395/102; 395/108; 395/117
[58] Field of Search .................................. 395/109, 101, 395/108, 102, 117, 112

[56] References Cited

U.S. PATENT DOCUMENTS

| | | | |
|---|---|---|---|
| 4,586,835 | 5/1986 | Alexander et al. | 400/121 |
| 5,093,903 | 3/1992 | Sudoh et al. | 395/102 |
| 5,134,495 | 7/1992 | Frazier et al. | 358/456 |
| 5,270,728 | 12/1993 | Lund et al. | 395/108 |
| 5,289,564 | 2/1994 | Morimoto et al. | 395/109 |

FOREIGN PATENT DOCUMENTS 0160318  11/1985  European Pat. Off. .
0513989  11/1992  European Pat. Off. .

OTHER PUBLICATIONS

European Search Report, Jun. 14, 1995, re Applicatoin 94106213.5.

Patent Abstracts of Japan, vol. 14, No. 490 (P–1122) Oct. 25, 1990 JP–A–02 199 585.

Patent Abstracts of Japan, vol. 12, No. 422 (P–783) Nov. 9, 1988, JP–A–63 157 277.

Patent Abstracts of Japan, vol. 13, No. 514 (M–894) Nov. 17, 1989, JP–A–01 208 155.

"Data To Dots In The HP Deskject Printer," D. J. May, M. D. Lund, T. B. Pritchard, C. W. Nichols, Hewlett–Packard Journal, Oct. 1988, pp. 76–80.

Primary Examiner—Mark R. Powell
Assistant Examiner—Tracy M. Legree

[57] ABSTRACT

Techniques are disclosed for depleting raster data to allow printing of the depleted raster data on a grid that corresponds to the resolution of the undepleted raster data with a printed dot size that is larger that would otherwise be utilized with the undepleted raster data and to achieve faster ink dry time. Also disclosed is a technique for up scaling raster data at a particular resolution (e.g., 300 dpi) to a higher resolution in such a manner that expanded data includes a greater number of dot producing pixels to compensate for a dot size that is larger than the dot size that is appropriate for the higher resolution, and does not require horizontal depletion for printing with such dot size. This allows raster data at a particular resolution to be combined with higher resolution rasterized vector data for printing in accordance with the enhanced mode of operation.

11 Claims, 12 Drawing Sheets

CARRIAGE SCAN

| | 1 | 2 | 3 | 4 |
|---|---|---|---|---|
| 1 | X | | | |
| 2 | | X | | |
| 3 | X | | | |
| 4 | | X | | |
| 5 | | | X | |
| 6 | | X | | |
| 7 | | | X | |
| 8 | | X | | |
| 9 | | | X | |
| 10 | | | | X |
| 11 | | | X | |
| 12 | | | | X |
| 13 | | | | |
| 14 | | | | X |
| 15 | | | | |
| 16 | | | | X |

PIXEL ROW

DOUBLE AXIS DOT DEPLETION FOR 600 DPI EDGE ACUITY WITH 300 DPI PRINT CARTRIDGE

This is a continuation-in-part of commonly assigned U.S. application Ser. No. 07/925,723, filed Aug. 3, 1992, abandoned, by Cariffe, Kadonaga, and Chen, for "METHOD FOR REDUCING PIXEL DENSITY ALONG A PLURALITY OF AXES OF A MULTIPLE DIMENSION IMAGE REPRESENTATION".

BACKGROUND OF THE INVENTION

The subject invention is generally directed to swath type printers, and more particularly to apparatus and techniques for reducing pixel density to allow for higher resolution printing with print elements designed for lower resolution printing.

A swath printer is a raster or matrix type printer that is capable of printing a plurality of rows of dots in a single scan of a movable print carriage across the print media. The possible locations for dots that can be printed by a raster printer can be represented by an array or grid of pixels or square areas arranged in a rectilinear array of rows and columns wherein the center to center distance or dot pitch between pixels is determined by the resolution of the printer. For example, if a printer is capable of printing 300 dots per inch (dpi), the dot pitch of the pixel array would be 1/300th of an inch.

The print carriage of a swath printer typically includes a plurality of printing elements (e.g., ink jet nozzles) displaced relative to each other in the media motion direction which allows printing of a plurality of rows of dots. The separation between the printing elements in the media scan direction corresponds to the dot pitch for the finest raster row resolution that can be printed by the printer in a single carriage scan (e.g., 1/300th of an inch for 300 dot per inch (dpi) resolution). The printing elements of a swath printer are commonly implemented in a printhead such as a thermal ink jet printhead that is integral to a replaceable thermal ink jet printhead cartridge.

The quality of the printed images produced by a raster printer depends to large degree on the resolution of the printer. Higher or finer resolution wherein the printed dots are more closely spaced provides for higher quality images.

A consideration with increasing the resolution of ink jet printers is that increased resolution requires more printed dots per unit area, with the number of dots increasing by the product of the increase factor along each dimension. For example, doubling print resolution from 300 dpi to 600 dpi results in four times as many dots per unit area. Since the number of dots per unit area increases with resolution, the size of each printed dot must decrease with increased resolution in order to avoid saturating the print media. For example, if a 300 dpi ink jet cartridge were utilized to print at 600 dpi, the amount of ink per unit area would increase by a factor of four, just as the number of dots increased. However, the design and implementation of higher resolution ink jet cartridges with reduced dot size may be impractical, and moreover the use of a reduced dot size that is appropriate for the highest printing resolution of the printer may also present difficulties in printing at reduced pixel densities that would be conveniently utilized for increased throughput in those situations where the reduced pixel densities would be acceptable, such as drafts.

SUMMARY OF THE INVENTION

It would therefore be an advantage to provide a thermal ink jet printer that processes raster data so that it can be printed with ink jet cartridges designed for a resolution that is lower than the resolution of the raster data to be printed.

The foregoing and other advantages are provided by the invention in an enhanced mode of printing wherein image raster data at a particular resolution (e.g., 600×600 dpi) is depleted so that the depleted image raster data can be printed on a raster grid having the particular resolution with dots that are larger (e.g., dots appropriate for 600×300 dpi) than would otherwise be utilized with the particular resolution, which avoids saturating the print media.

In accordance with further aspect of the printer disclosed herein, raster data at a particular resolution (e.g., 300×300 dpi) is scaled up to a higher resolution (e.g., 600×600 dpi) in such a manner that the expanded data includes a greater number of dot producing pixels to compensate for a dot size that is larger than the dot size that is appropriate for the higher resolution, and does not require horizontal depletion for printing with such dot size. This allows raster data at a particular resolution to be combined with higher resolution rasterized vector data for printing in accordance with the enhanced mode of operation.

BRIEF DESCRIPTION OF THE DRAWINGS

The advantages and features of the disclosed invention will readily be appreciated by persons skilled in the art from the following detailed description when read in conjunction with the drawing wherein:

FIG. 14 is a table that illustrates the sequence in which pixel rows are printed with a nozzle array having a nozzle pitch that is twice the pitch of the pixel rows.

DETAILED DESCRIPTION OF THE DISCLOSURE

Figure 1:
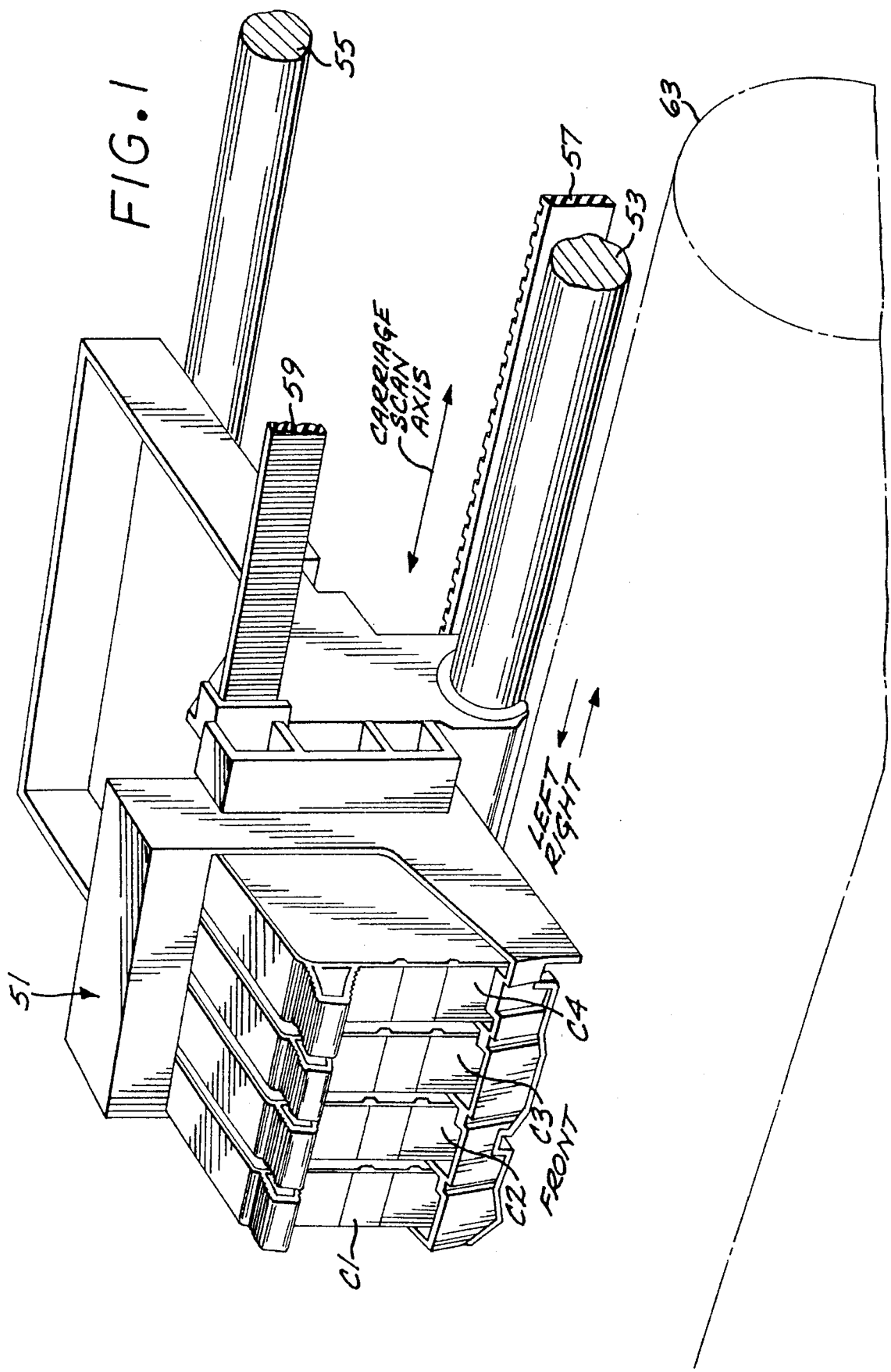
FIG. 1 is a schematic perspective view of the major mechanical components of a thermal ink jet printer employing the disclosed print techniques.

In the following detailed description and in the several figures of the drawing, like elements are identified with like reference numerals.

The invention is generally directed to techniques by which the raster data for an image is depleted in a predetermined manner whereby selected pixels that are on are turned off, so as to prevent placing too much ink on the print medium. Pursuant to raster data depletion, a higher print resolution is achieved with a printed dot size that is sized for a lower print resolution.

Referring now to FIG. 1, set forth therein is a schematic frontal quarter perspective view depicting, by way of illustrative example, major mechanical components of a multiple printhead ink jet printer in which the techniques of the invention can be implemented. The printer includes a movable carriage 51 mounted on guide rails 53, 55 for translational movement along the carriage scan axis (commonly called the Y-axis in the printer art). The carriage 51 is driven along the guide rails 53, 55 by an endless belt 57 which can be driven in a conventional manner, and a linear encoder strip 59 is utilized to detect position of the carriage 51 along the carriage scan axis, for example in accordance with conventional techniques.

Figure 2:
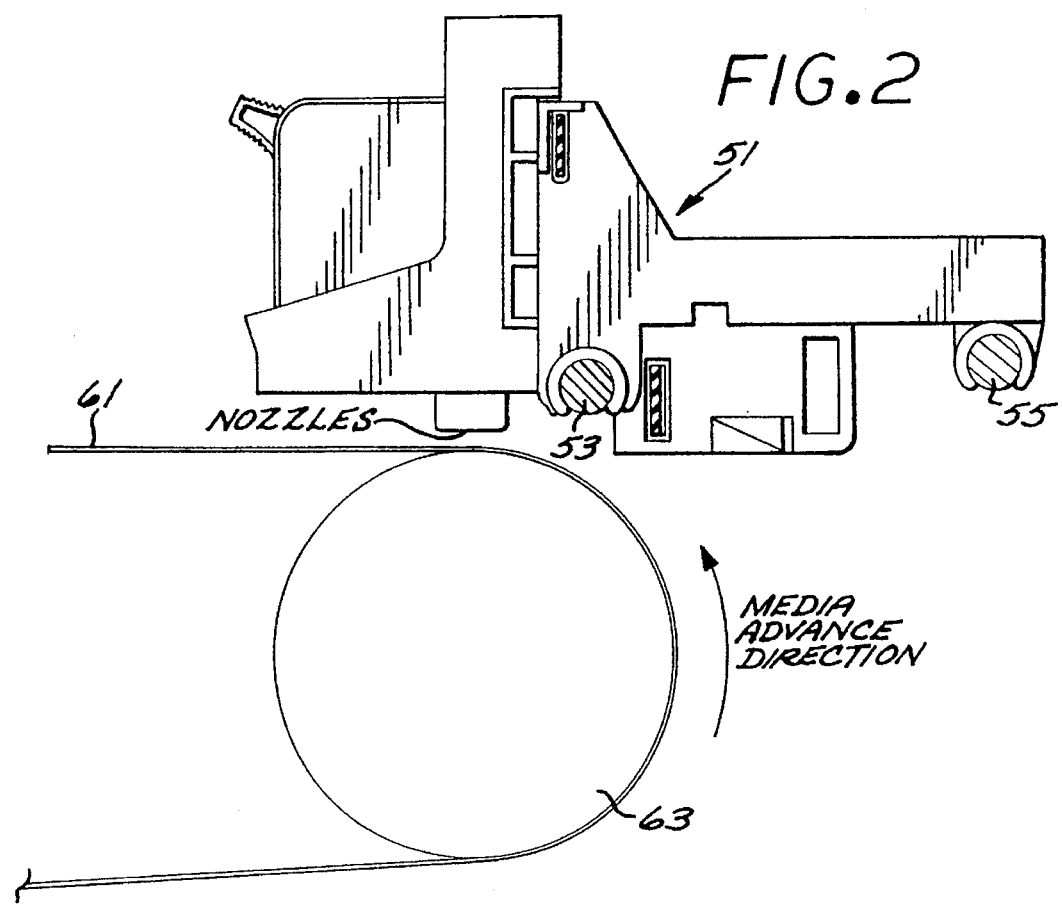
FIG. 2 is a schematic side elevational sectional view illustrating the relation between the downwardly facing ink jet nozzles and the print media of the printer of FIG. 1.

The carriage 51 supports four thermal ink jet printhead cartridges C1, C2, C3, C4 (sometimes called "pens," "print cartridges," or "cartridges") which are side by side along the carriage axis. As depicted in FIG. 2, the printhead cartridges C1, C2, C3, C4 include downwardly facing nozzles for ejecting ink generally downwardly to a print media 61 which is supported on a print roller 63 that is generally below the printhead cartridges.

For reference, the print cartridges C1, C2, C3, C4 are considered to be on the front of the printer, as indicated by legends on FIG. 1, while left and right directions are as viewed while looking toward the print cartridges, as indicated by labelled arrows on FIG. 1. By way of example, the print media 61 is advanced while printing or positioning so as to pass from beneath the cartridge nozzles toward the front of the printer, as indicated on FIG. 2, and is rewound in the opposite direction.

Figure 3:
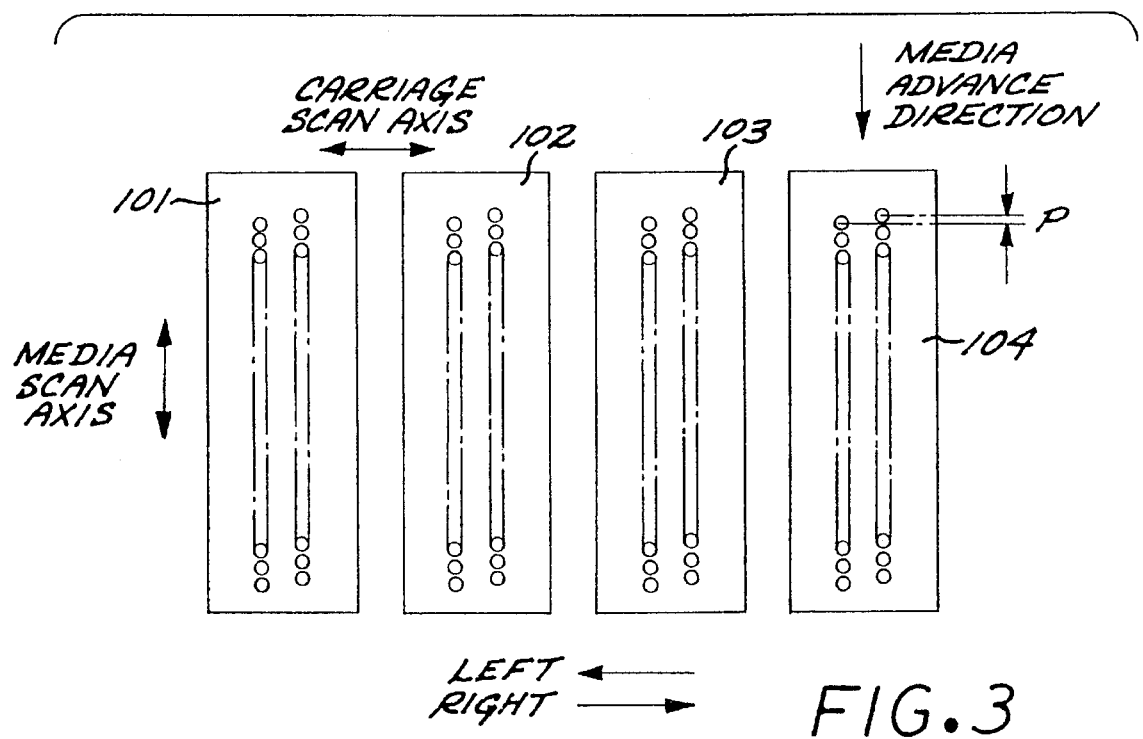
FIG. 3 is a schematic plan view illustrating the general arrangement of the nozzle arrays of the printhead cartridges of the printer of FIG. 1.

The media scan axis as depicted in FIG. 3 is considered as being generally tangential to the print media surface that is below the nozzles of the printhead cartridges and orthogonal to the carriage scan axis. It is noted that the media scan axis is sometimes called the "vertical" axis, probably as a result of those printers having printing elements that printed on a portion of the print media that was vertical. Also, the carriage scan axis is sometimes called the "horizontal axis".

By way of illustrative example, the cartridges C1, C2, C3 comprise non-black color printing cartridges for producing the base colors of yellow, cyan, and magenta as commonly utilized in color printing, while the cartridge C4 comprises a black printing cartridge.

FIG. 3 schematically depicts the arrangement of the nozzle plates 101, 102, 103, 104 of the cartridges C1, C2, C3, C4 as viewed from above the nozzles of the cartridges (i.e., the print media would be below the plane of the figure). Each nozzle plate includes an even number of nozzles arranged in two columns wherein the nozzles of one column are staggered relative to the nozzles of the other column. The distance along the media scan axis between diagonally adjacent nozzles, as indicated by the distance P in FIG. 3, is known as the nozzle pitch, and by way of example is equal to the highest media axis resolution that the printer is capable of printing in a single carriage scan (e.g., 1/300 inch for 300 dpi along the media axis in one carriage scan). In use, the physical spacing between the columns of nozzles in a printhead is compensated by appropriate data shifts in the swath print data so that the two columns function as a single column of nozzles.

Figure 4:
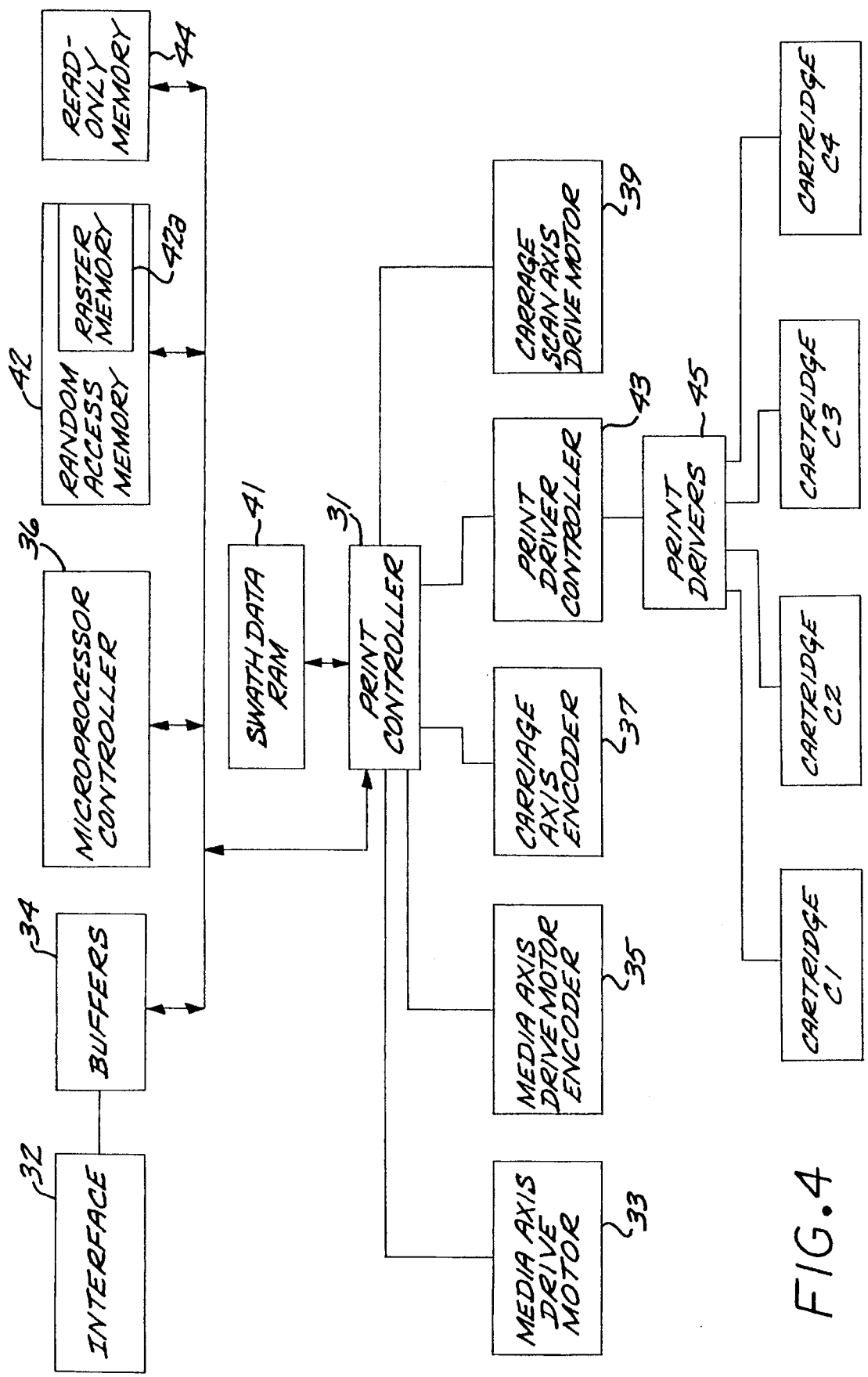
FIG. 4 is a simplified block diagram of a printer control system for controlling the swath printer of FIG. 1.

Referring now to FIG. 4, set forth therein is a simplified block diagram of a control system for controlling the thermal ink jet printer of FIG. 1 in which the techniques of the invention can be implemented. The control system includes an interface 32 which receives print data from a host computer, for example, and stores the print data in a buffer memory 34. A microprocessor controller 36 is configured to process the print data to produce raster data that is stored in a bit-map memory 42a contained in a random access memory (RAM) 42 provided for the use of the microprocessor controller. A read-only memory 44 is also provided as appropriate for the use of the microprocessor controller 36. Processes in accordance with the invention, as described further herein, can be performed by the microprocessor controller 36 in conjunction with look-up tables contained in the read-only memory 44.

A print controller 31 transfers portions of the raster data from the bit-map memory 42a to a swath memory 41 and provides swath data to a printhead driver controller 38 which controls printhead drivers 45 that drive the ink firing elements of the printhead cartridges C1, C2, C3, C4. The print controller 31 further controls a media axis driver motor 33 which moves the print roller 63 pursuant to media motion commands from the print controller 31. A media axis drive motor encoder 35 provides information for the feedback control of the media axis driver motor 33. Similarly, a carriage axis encoder 37 provides feedback information for the feedback control of a carriage scan axis drive motor 39 which positions the ink jet cartridge supporting carriage 51 pursuant to carriage motion commands from the print controller 31.

Figure 5:
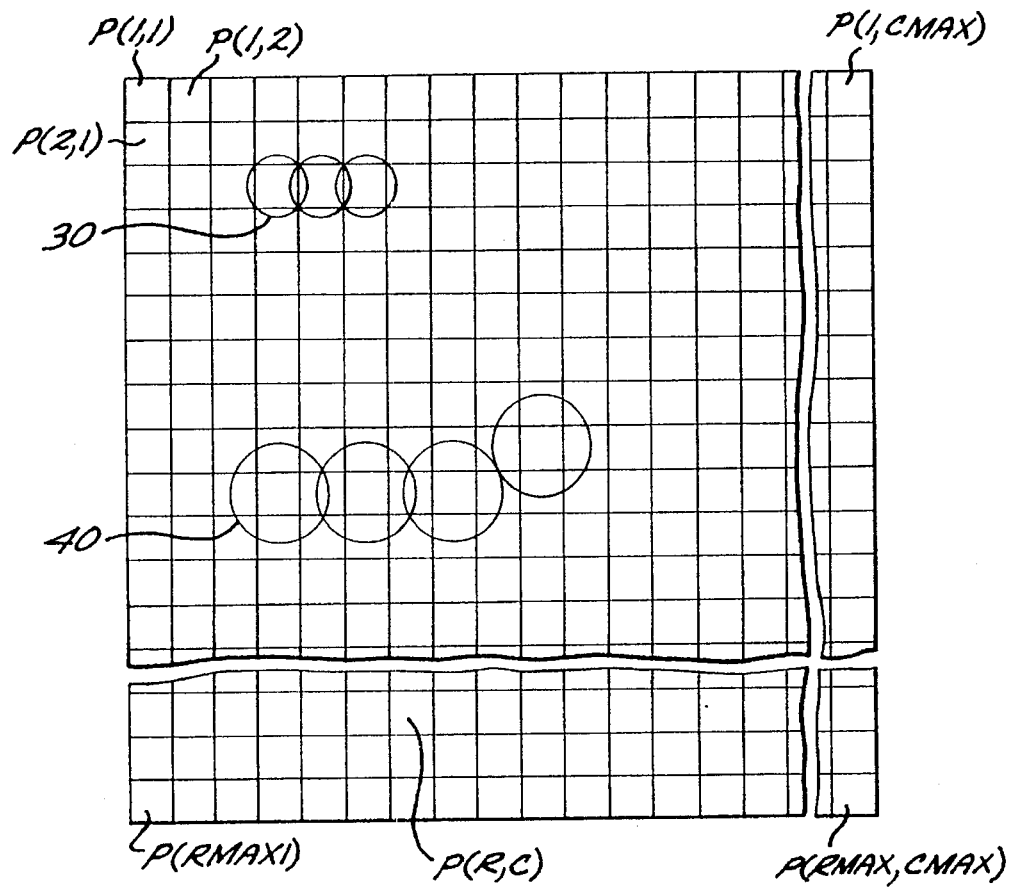
FIG. 5 schematically illustrates a pixel array on which dots can be selectively printed by the printer to form a printed image, and further schematically illustrates printed dots of different sizes.

In discussing the printing of dots onto a print medium, the area to be printed is commonly characterized as an array of pixels on which the printer can selectively print dots to form the desired image, and FIG. 5 schematically illustrates a portion of a two dimensional grid or array of pixels P(1,1) through P(RMAX,CMAX) each of which defines a location on a two dimensional print medium where a dot can be printed. The pixels P are squares arranged in rows and columns in a rectilinear array, wherein each row is represented as extending horizontally and each column is represented as extending vertically, and each pixel P(R,C) has a corresponding location in the bit-map raster memory 42a contained in main RAM 42, such that there is a one-to-one correspondence between locations in the raster memory 42a and the pixel array to be printed. For the particular example of a binary printing, the data for each pixel comprises a binary bit that defines whether or not a dot is to be printed at that pixel. For ease of reference, in this disclosure a pixel bit contains a 1 if a dot is to be printed on the corresponding pixel, but it should be appreciated that a 0 can be utilized to indicate that a dot will be printed, depending upon implementation.

By way of reference, the horizontal or row dimension of the pixel array corresponds to the carriage axis, while the vertical or column dimension of the pixel array corresponds to the media axis, and each of the pixels P(R,C) in the grid of FIG. 5 is uniquely identified by an ordered pair of numbers (R,C) wherein R is the row in which the pixel is located and C is the column in which the pixel is located. For convenience, the rows are number 1 through RMAX starting with the top row, and the columns are numbered 1 through CMAX starting with the leftmost column. Thus, the pixel at the top left corner is pixel P(1,1). The number of pixels per unit of horizontal distance is referred to as the horizontal resolution, and is commonly expressed in "dots per inch" or dpi, for example 300 dpi or 600 dpi. The vertical resolution can be similarly expressed. The composite resolution can be expressed by specifying horizontal and vertical resolution, for example 300×300 dpi or 600×600 dpi.

For ease of reference, the row of pixel data that is prior to a particular row R is sometimes called the overlying row, and a pixel that is in the prior row and adjacent a particular pixel is sometimes called the overlying pixel. Similarly, the terms underlying row and underlying pixel respectively refer to the row that is next in sequence and the adjacent pixel that is in the next row.

The bit-mapped raster data for the pixel array is logically organized to correspond to the rows and columns of the physical arrangement of the printed pixel array, although in accordance with conventional bit mapping techniques the bit-mapped raster data for an array of pixels does not necessarily have to be in the form of rows and columns. Thus, the schematic representation of the pixel array or grid also represents the bit-map raster data that defines the printed state of each of the pixels in the pixel array. For convenience each of the raster data bits for a pixel array will also be identified as P(R,C) since a pixel necessarily includes an associated one-bit data location in the bit-map memory, and it will be clear from the context as to whether the pixel or the pixel data is being referenced.

Dots printed at pixel locations generally comprise roughly circular dots generally centered on the pixel locations for which the dots are intended. For a given pixel size, the size of the printed dot is selected to be slightly larger than the pixel size, as represented in FIG. 5 by circles 30 on a plurality of horizontally adjacent pixels, such that when a drop is applied to each pixel in a region, the entire region is covered with ink. If the ink drop volume is increased beyond the minimum that achieves complete coverage for fill regions, print quality deteriorates. The excess ink will cockle the paper and increase the time required for the ink to dry. Moreover, with excessive drop volume, single pixel lines will be wider, reducing the resolvability of line pairs, greyscale ramps produced by dithering will show more non-linearity because of greater dot overlap. Also, lines and arcs generated by superimposing circular dots show scalloping defects along their edges. Accordingly, it is important to size the drop volume so that it barely produces closure at the raster resolution for which the drop volume is designed. For an isotropic pixel grid (e.g., 300×300 dpi or 600×600 dpi), the minimum dot diameter for closure is $2^{1/2}*S$, where S is the grid spacing.

In accordance with one aspect of the printer disclosed herein, enhanced mode raster data depletion is provided for monochrome printing with the black printing printhead cartridge C4 wherein the image raster data at a particular resolution (e.g., 600×600 dpi) is depleted so that the depleted image raster data can be printed on a raster grid having the particular resolution with dots that are larger than would otherwise be utilized with the particular resolution, as represented in FIG. 5 by circles 40 on a plurality of horizontal pixels that are respectively separated from each other by one pixel. By way of illustrative example, raster data for a 600×600 dpi grid is depleted so that it can be printed on a 600×600 dpi grid with a dot size, represented by the circles 40, that is suitable for 600×300 printing. It is noted that 600×300 printing can be performed with 300×300 dpi data by "double dotting" each pixel in the carriage scan direction, for example by printing a dot to the right of each printed dot on a 300 dpi row that is parallel to the carriage axis.

The minimum size of the 600×300 dot is related to the 600 dpi grid spacing S as follows. The minimum size required for closure is that size which allows two diagonally adjacent dots in adjacent 600 dpi rows and in adjacent 300 dpi columns to be tangential as shown by the dots 40 in FIG. 5. From basic geometry, the diameter of the minimum 600×300 dot is $(5)^{1/2}*S$, where S is equal to 1/600 inch for a 600 dpi grid. Accordingly, the area of a minimum 600×300 dot is about 2.5 times the area of a minimum 600 dpi dot. Since a dot for 600×300 dpi printing has about 2.5 times the area of a 600 dpi dot, printing a 600 dpi image with 600×300 dpi dots would result in about 2.5 times as much ink in comparison to printing the same image with 600 dpi dots, which would unacceptably saturate the printing medium. For the particular example of printing a 600×600 dpi image with 600×300 dpi dots, a technique in accordance with the invention depletes the 600 dpi raster data so that the depleted raster data can be printed on a 600×600 dpi grid with 600×300 dpi dots with the appropriate amount of ink.

In accordance with further aspect of the printer disclosed herein, raster data at a particular resolution (e.g., 300×300 dpi) is scaled up to a higher resolution (e.g., 600×600 dpi) in such a manner that the expanded data does not require horizontal depletion for printing with the black printing cartridge C4 at the higher resolution with a dot size intended for the lower resolution, and which provides for "double dotting" in the media axis direction so as to provide an increased amount of ink for use of dots intended for a resolution that is intermediate the lower resolution and the higher resolution. This allows raster data at particular resolution to be combined with higher resolution rasterized vector data for printing in accordance with the enhanced mode of operation.

Enhanced Mode Raster Data Depletion

Enhanced mode raster data depletion is directed to depleting monochrome raster data at a particular resolution so that it can be printed by the black printing cartridge C4 on pixel array having the same resolution with a dot size that configured for a lower resolution and thus larger than what would be utilized in printing the undepleted raster data. Pursuant to enhanced mode raster data depletion, the raster data is subjected to depletion along the horizontal axis and depletion along the vertical axis on a row by row basis. It should be appreciated that to the extent horizontal depletion is sufficient to achieve the desired dot density, vertical dot depletion may be eliminated.

Horizontal depletion is directed to depleting raster data along the horizontal axis to reduce the overall pixel density of interior pixels in a filled region, while preserving those pixels that define the edges of graphical primitives. As is well known, primitive objects (also called primitives or objects) comprise the predetermined basic or fundamental shapes such as vectors, rectangles, triangles, trapezoids, parallelograms, circles, and so forth, that are utilized by the printer to form the information to be printed. Primitives are represented in a raster bilevel pixel data array by a continuous group of bits extending across several rows and columns of the array. The bits corresponding to pixels that belong to a primitive are given a value sometimes referred to as the "foreground value" (typically 1 but sometimes 0), while bits corresponding to pixels not belonging to a primitive are given a value called the "background value" (typically 0 but otherwise 1 if the foreground value is 0). Each group of contiguous foreground bits within a single row comprises a horizontal run; i.e., a series of consecutive bits of a row that are all set to the foreground value. The first and last bits in a run therefore correspond to edge pixels of a primitive. In accordance with the invention, horizontal depletion leaves edge pixels of a run in their original foreground state, while resetting some pixels in the interior of a run to the background value. In particular, horizontal depletion is performed in a uniform manner, so that each printed pixel is separated by at least one non-printed pixel from another printed pixel, except possibly when a printed pixel is adjacent an edge pixel of a run which is preserved. Since the two end pixels of a horizontal run are preserved, it should be appreciated that for a horizontal run having an even number of pixels, the depleted run will contain a printed pixel interiorly adjacent one of the edge pixels. For runs having an odd number of pixels, all interior pixels will be separated from another printed pixel by a non-printed pixel.

In the following discussion, for ease of reference, the foreground value will be 1 and the background value will be 0, but it should be appreciated that the invention can be implemented with 0 as the foreground value and 1 as the background value.

In terms of a raster defined by a coordinate system having its origin at the upper left corner as shown in FIG. 5, horizontal axis depletion in accordance with the invention can be performed on each row, for example, by sequentially examining each of the pixels P(R,2) through P(R,CMAX−1) starting with the second pixel from the left, and resetting to 0 each pixel that has a 1 to its left and a 1 to its right. Alternatively, horizontal axis depletion can be performed by sequentially examining each pixel starting with the second pixel from the right and resetting a pixel to 0 if it has a 1 to its right and a 1 to its left.

Vertical depletion is directed to further depleting the horizontally depleted raster data to reduce ink drying time and in a controlled manner that preserves top and bottom edges of primitives, avoids excessive depletion, and avoids excessive ink in large fill-in areas.

Figure 6:
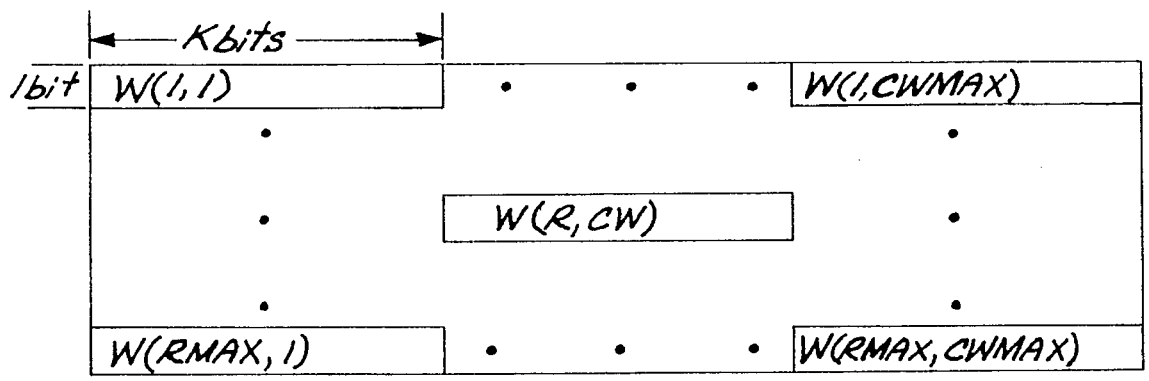
FIG. 6 schematically illustrates the organization of a raster data swath into an array of K-bit wide words for horizontal depletion and vertical depletion in accordance with the invention.

Enhanced mode raster data depletion is conveniently performed by organizing a raster data array, for a page for example, into a sequence or series of adjacent swaths wherein a swath extends completely along the column dimension of the raster data array and extends along a fraction of the row dimension of the raster array. For example, swaths can comprise bands each of which is of the width of the pixel array and a fraction of the height of the pixel array. By logically organizing the printed pixel array into swaths, raster data for the printed image is stored only as required, and raster data for the entire printed image does not have to be stored. Each row of a swath of raster data is conveniently organized as a sequence of immediately adjacent, non-overlapping K-bit words W(R,CW) as shown in FIG. 6, wherein R is the row position and CW is the column position of a K-bit word W(R,C) in the swath. The number of rows in the swath is RMAX, while the number of columns is CWMAX. Pursuant to such organization, depletion is performed on a word by word basis as more particularly described herein. For ease of reference, the row that is prior to a particular row will sometimes be called the overlying row, and the word that is in the prior row and adjacent a particular word is sometimes called the overlying word. Similarly, the terms underlying row and underlying word respectively refer to the row that is next in sequence and the adjacent word that is in the next row.

Figure 7:
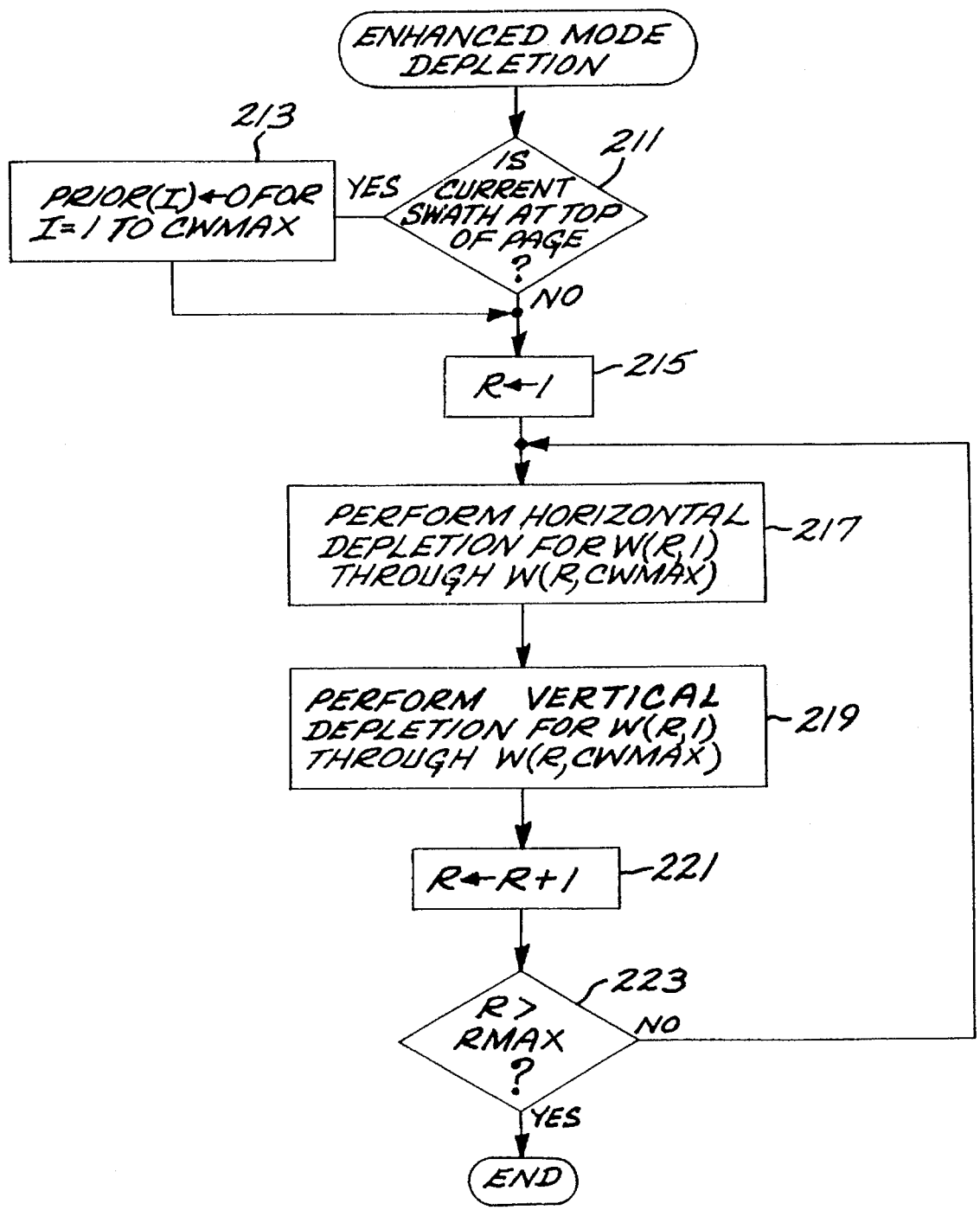
FIG. 7 sets forth a generalized flow diagram of pixel row by pixel row horizontal and vertical depletion in accordance with the invention.

Referring now to FIG. 7, schematically set forth therein is a flow diagram of the overall procedure of enhanced mode raster data depletion as performed on a swath of raster data. At 211 a determination is made as to whether the current swath to be depleted is at the top of a page. If yes, at 213 an array of K-bit words PRIOR(1) through PRIOR(CWMAX) is initialized to all 0's, and control transfers to 215 where a row index counter R is initialized to 1. If the determination at 211 is no, processing continues at 215 where the row index counter R is initialized to 1. At 217 horizontal depletion of the raster data of row R is performed, and at 219 vertical depletion of the now horizontally depleted raster data of row R is performed. At 221 the row index counter R is incremented by 1, and at 223 a determination is made as to whether the row index counter is greater than the number of rows RMAX. If no, control transfers to 217. If the determination at 223 is yes, raster depletion has been completed and the procedure ends.

Figure 8:
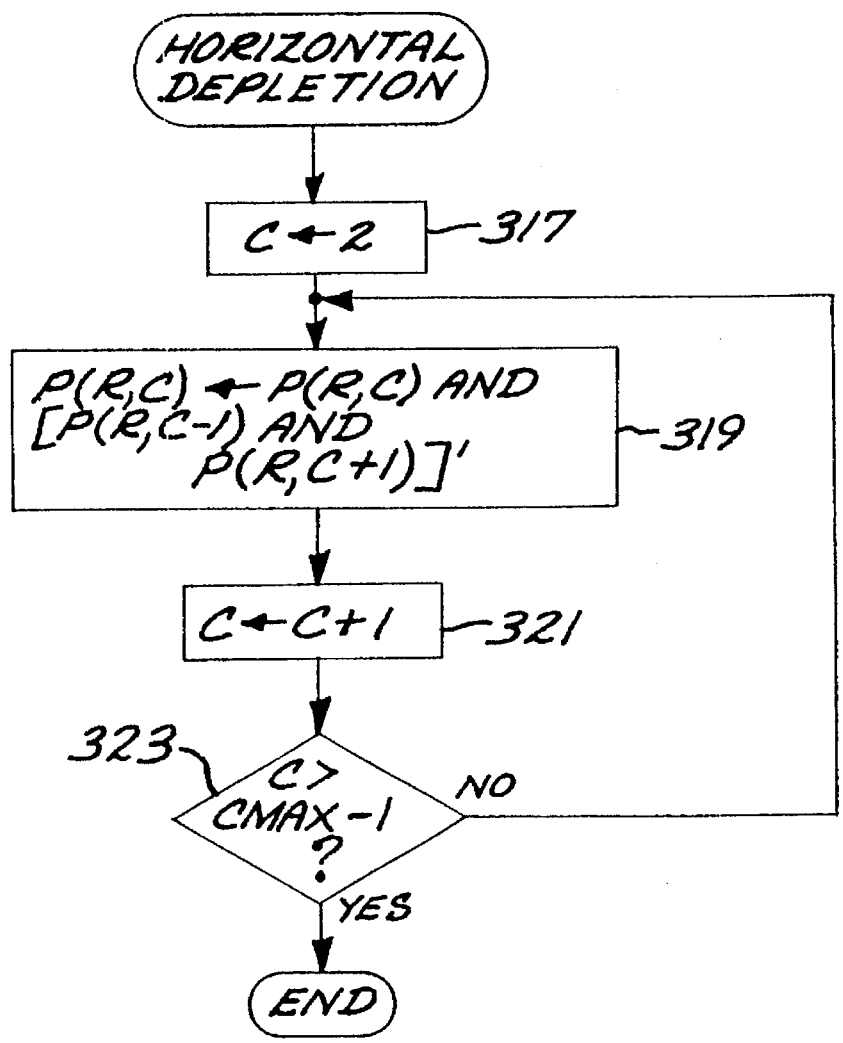
FIG. 8 sets forth a flow diagram of a procedure for performing horizontal depletion of a row of raster data in accordance with the invention.

FIG. 8 sets forth by way of illustrative example a flow diagram of a procedure for performing the step of horizontal depletion in the procedure of FIG. 7 for the particular example of depleting the pixels of the current row R in the left to right direction. At 317 a column index C is initialized to 2, and at 319 the pixel bit P(R,C) is replaced with the result of the bitwise binary ANDing the present contents of the pixel bit P(R,C) with the binary 1's complement of the result of bitwise binary ANDing the contents of the pixel bit P(R,C−1) with the pixel bit P(R,C+1), which are the bits to the left and right of the pixel bit P(R,C). It is noted that an apostrophe (') is used in the figures and in the written description to denote the binary 1's complement. At 321 the column index C is incremented by one, and at 323 a determination is made as to whether the column index C is greater than the number of pixel columns CMAX minus 1. If no, processing transfers to 319 for examination of the next bit in sequence. If the determination at 323 is yes, the column index C has exceeded CMAX−1, the procedure ends.

By way of particular illustrative example, the horizontal depletion procedure of FIG. 8 can be implemented by implementing a depleter look-up table in the read-only memory of the printer control system of FIG. 4 and replacing each K-bit word with a K-bit word retrieved from the depleter table.

Figure 9:
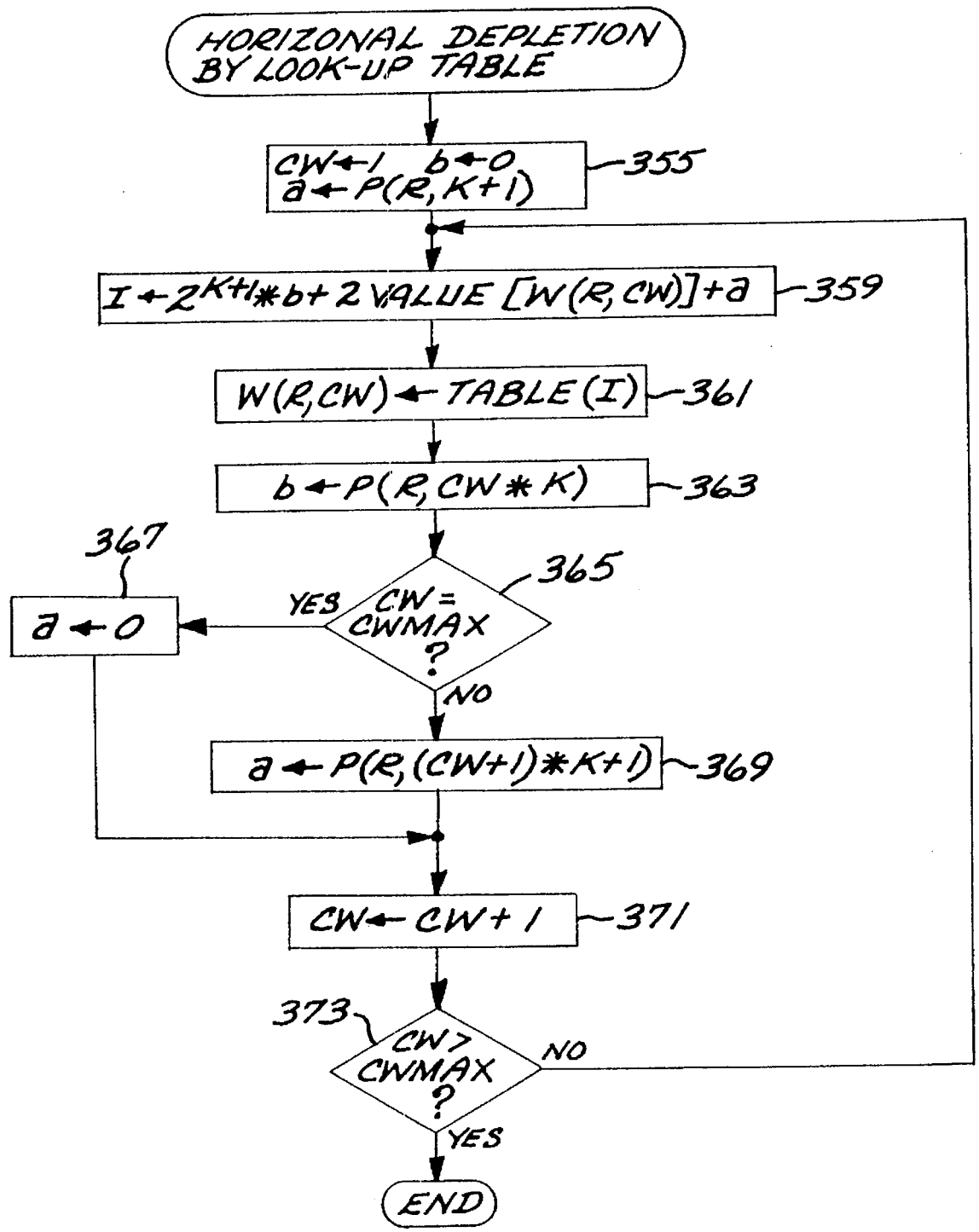
FIG. 9 sets forth a flow diagram of a procedure for performing horizontal depletion of a row of raster data in accordance with the invention by use of a depleter look-up table.

Referring now to FIG. 9, set forth therein by way of illustrative example is a flow diagram of a procedure for performing horizontal depletion in the procedure of FIG. 7 by replacing the K-bit words of the current row of raster data with depleted K-bit words retrieved from a look-up table pursuant to a look-up table index I that is based on the K-bit word being depleted and two additional bits as described further herein. It should be appreciated that the row width of the raster data might result in bits at the end of each row that do not form a complete K-bit word. In accordance with conventional processing techniques, any unused bits in the rightmost word are padded with 0's. At 355 a word array column index CW is initialized to 1, and variables a and b, which will be used to store the additional bits for the depleter look-up table index I are initialized. In particular, b is initialized to 0 while a is set to P(R,K+1) which is the value of the leftmost pixel of the second K-bit word in the present row R. At 359 the index I to the depleter look-up table is formed by summing $b*2^{k+1}$, two times the composite binary value of the K-bit word W(R,CW), and a. At 361 the word W(R,CW) is replaced with the K-bit word retrieved by accessing the depleter look-up table with the depleter look-up table index I. At 363, the contents of b is replaced with the contents of the rightmost bit P(R,CW*K) of the depleted word W(R,CW) with the pixel bits of the K-bit word array being identified as represented in FIG. 5. At 365 a determination is made as to whether the word array column index CW is equal to the number of word columns CWMAX. If yes, at 367 the variable a is set to 0, and control transfers to 371. If the determination at 365 is no, at 369 the variable a is set to the value of the pixel immediately to the right of the word in the next column CW+1 of the current row R; i.e., a is set to P(R,(CW+1)*K+1). At 371 the word column index CW is incremented by one and at 373 a determination is made as to whether the word column index CW exceeds the total number of word columns CWMAX. If no, control transfers to 359. If the determination at 373 is yes, the word column index CW has exceeded the number of word columns CWMAX, the procedure ends.

In the horizontal depletion procedure, the index I to the depleter look-up table comprises a (K+2)-bit word W(R,C) that is formed of a most significant bit b, the K-bit word to be depleted, and a least significant bit a, wherein b is the least significant bit of the prior in row word W(R,C−1), if any, and a is the most significant bit of the next in row word W(R,C+1), if any. The most significant bit b of the (K+2)-bit index I is 0 for the words in the leftmost column while the least significant bit a of the (K+2)-bit word for the index I is a 0 for the words in the rightmost column.

The entries of the depleter table are readily determined, for example by generating every possible combination of K+2 bits and determining the resulting depleted pattern of the K-bit word that is between the most significant and least significant bits thereof.

Effectively, the horizontal depletion procedures of FIGS. 8 and 9 separate each printed pixel in a row by a non-printed pixel except at (1) a left or right edge of a primitive which is indicated by a 0 to the left or right of a printed pixel, (2) a left or right end of a horizontal run of 1's in the original pixel data, or (3) the right and left sides of a swath.

Figure 10:
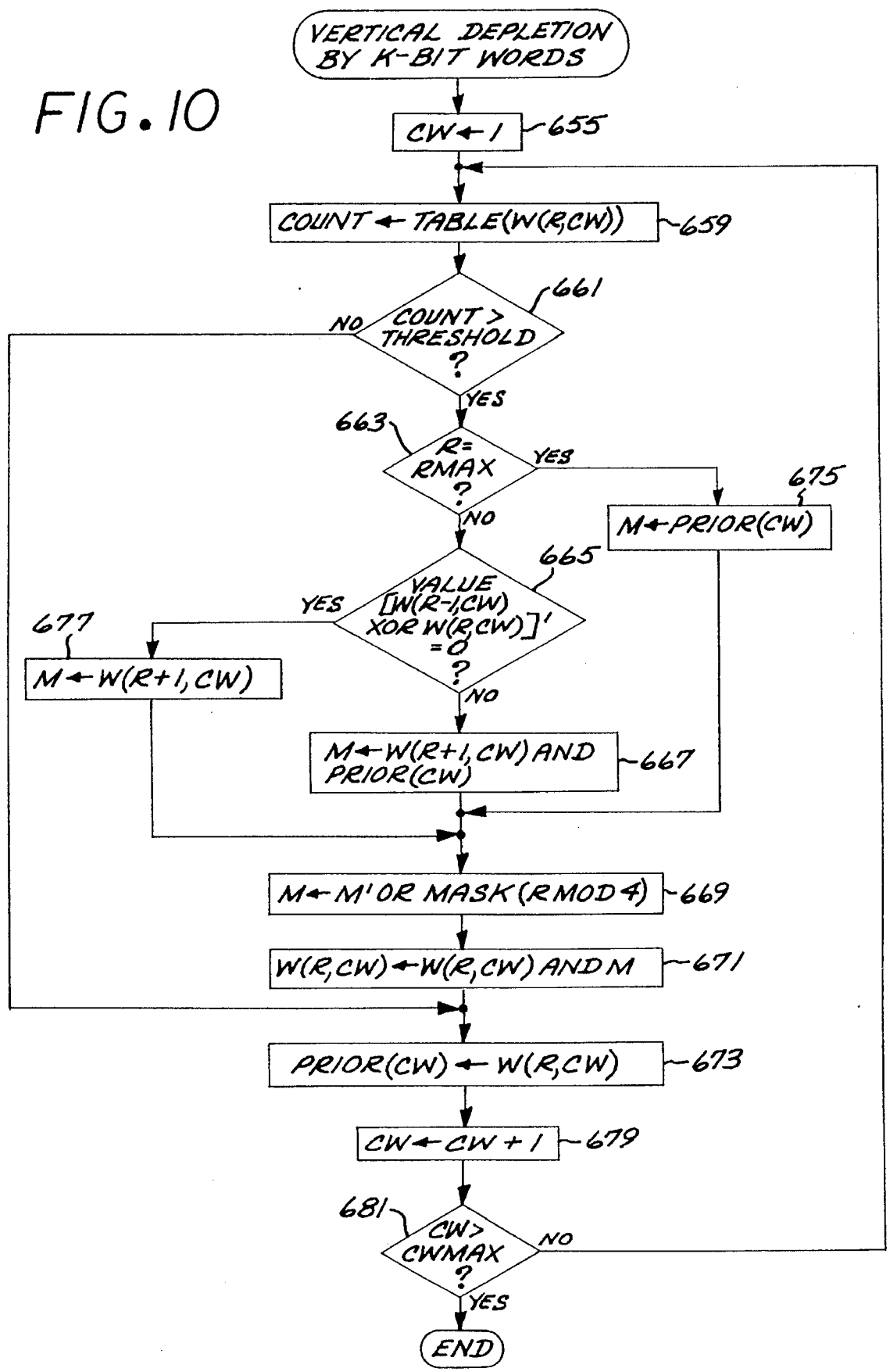
FIG. 10 sets forth a flow diagram of a procedure for performing vertical depletion of raster data row of raster data in accordance with the invention.

Referring now to FIG. 10, set forth therein by way of illustrative example is a flow diagram of a procedure for vertically depleting a row of raster data in accordance with the invention. At 655 a word column index CW is initialized to 1, and at 659 a bit COUNT is set to the number of the set bits in the current word W(R,C), for example by accessing a look-up table using the binary value of the current word as the index thereto, wherein the look-up table contains the numbers of set bits for all the different possible bit patterns of a K-bit word. To the extent a relatively large word size is utilized (e.g., 32 bits), the word can be divided into bytes which are respectively utilized to access a look-up table. The retrieved numbers of set bits for the bytes of a word are then added together to determine the COUNT of the set bits in the word. COUNT is intended to be representative of the average set bit density in a predetermined area that includes the word being considered for depletion, and can be determined in other ways, for example for a larger region that encloses the word being considered for depletion. This would require more computation, but would help further restrict depletion to only those areas where depletion is really necessary.

At 661 a determination is made as to whether COUNT is greater than a predetermined THRESHOLD which is selected such that only words having a sufficiently high average set bit density are depleted. If the determination at 661 is no, the current word is not depleted and control transfers to 673. If the determination at 661 is yes, at 663 a determination is made as to whether the current row index R is equal to the total number of rows RMAX. If no, at 665 a determination is made as to whether the binary 1's complement of the K-bit result of bitwise binary exclusive-ORing (XORing) W(R,CW) with PRIOR(CW) has a value of zero. This checks whether the current K-bit word W(R, CW) contains alternating 1's and the overlying K-bit word, if any, as stored in PRIOR(CW) contains alternating 1's that are offset by one column relative to the alternating 1's of W(R,CW). If no, at 667 a depletion mask M is set to the K-bit result of bitwise binary ANDing the underlying K-bit word W(R+1,C) with the overlying K-bit word as stored in PRIOR(CW). At 669 the depletion mask M is changed to contain the result of bitwise binary ORing the binary 1's complement of the present contents of the depletion mask M with a bit preserving MASK(R mod 4), wherein MASK(R mod 4) refers to (R modulo 4)$^{th}$ MASK of an array of four K-bit Masks which are used on a rotational basis to avoid obvious patterning in the columns being depleted. In particular, MASK(1) would be used for rows 1, 5, 9, . . . , MASK(2) would be used for rows 2, 6, 10, . . . , and so forth. For the particular implementation wherein the word width K is equal to thirty-two (32), the following are illustrative examples of binary values for MASK(1) through MASK(4), each of which has been separated into 4-bit half bytes for ease of reference:

| MASK(1): | 1111 | 1001 | 1111 | 1001 | 1111 | 1001 | 1111 | 1001 |
|---|---|---|---|---|---|---|---|---|
| MASK(2): | 1111 | 1111 | 1111 | 1111 | 1111 | 1111 | 1111 | 1111 |
| MASK(3): | 1001 | 1111 | 1001 | 1111 | 1001 | 1111 | 1001 | 1111 |
| MASK(4): | 1111 | 1111 | 1111 | 1111 | 1111 | 1111 | 1111 | 1111 |

At 671 the current word W(R,CW) is replaced with the K-bit word obtained by bitwise binary ANDing the present contents of the word W(R,CW) with the contents of the depletion mask M. At 673 the K-bit word PRIOR(CW) is set to the contents of the word W(R,CW), and at 679 the word column index CW in incremented by 1. At 681 a determination is made as to whether the word column index CW is greater than the number of word columns CWMAX. If no, control transfers to 659. If the determination at 681 is yes, the word column index CW is greater than the number of word columns CWMAX, the procedure ends.

If the determination at 663 is yes, the row index R is equal to the total number of rows RMAX, which indicates that the current row is the last row in the current swath, at 675 a K-bit depletion mask M is set to the present contents of the overlying K-bit word as stored in PRIOR(CW), and control transfers to 669 for modification of the depletion mask M pursuant to the current bit preserving MASK(RMAX mod 4). It should be appreciated that the K-bit depletion mask M for the last row RMAX is based only on the overlying word as stored in PRIOR(CW) and the current mask MASK(RMAX mod 4) since there is no information as to the top row of the next swath, if any.

If the determination at 665 is yes, the value of the binary 1's complement of the K-bit result of bitwise binary Exclusive-ORing (XORing) W(R,CW) with PRIOR(CW) is zero, which indicates that the current K-bit word W(R,CW)

contains alternating 1's and the overlying K-bit word as stored in PRIOR(CW) contains alternating 1's that are offset by one column relative to the alternating 1's of W(R,CW), at 677 a K-bit depletion mask M is set to the present contents of the underlying word W(R+1,C), and control transfers to 669 for modification of the depletion mask M pursuant to the current bit preserving mask MASK(RMAX mod 4). It should be appreciated that the K-bit depletion mask M for the current word W(R,C) which forms a checkerboard pattern with the overlying word as stored in PRIOR(CW) in the present column is based only on the next word W(R+1,C) in the current column and the current bit preserving mask MASK(RMAX mod 4). The next word W(R+1,C) in the current column is appropriate for use as a mask since it has not been horizontally depleted, and thus could not form a checkerboard pattern with the current word.

In the procedure of FIG. 10, a set bit THRESHOLD is utilized to determine whether a word requires depletion, and a bit preserving MASK is utilized so that less than 50% vertical depletion occurs. Guidelines for setting the value of the set bit THRESHOLD, and for defining the bit preserving MASK patterns will now be discussed.

As to THRESHOLD, the value utilized therefor is based on the desired number of dots per pixel. For example, if the dot size is such that an average of 1.75 dots per 300 dpi pixel is desired, then the number of dots per 600 dpi pixel is $1.75/4 = 7/16$, since there are 4 600 dpi pixels for each 300 dpi pixel. For the particular example of examining a 32-bit word to determine ink density as represented by the set bits, the THRESHOLD would be set to the number of set bits in a 32-bit word that would provide an average of $7/16$ dots per 600 dpi pixel, and that number of pixels is $(7/16)*32=14$ pixels. Thus, if there are 14 or fewer set bits in a particular 32-bit word, there is no need for vertical depletion since the average number of printed dots that is printed pursuant to that particular word is less than $7/16$ dots per pixel.

As to the bit preserving MASK patterns, the masking operation is utilized to reduce the number of bits depleted that would otherwise be removed if the procedure of horizontal depletion were applied in the vertical direction. Thus, for example, if it is determined that vertical depletion should be performed only on every other row, then the bit preserving MASK patterns would include a bit preserving pattern of all 1's, as shown previously for alternating rows of a bit preserving MASK pattern that included 4 rows that were utilized sequentially in a repeated manner relative to the rows of raster data on which vertical depletion was being performed. By vertically depleting only every other row of raster data, the burden of vertical depletion is placed on the remaining rows. Thus, the average set bit density for two vertically adjacent words is considered. For the example discussed above as to vertically depleting a 32-bit word only if the number of set bits is greater than 14, an average of 14 set bits per word for two vertically adjacent 32-bit words is achieved if the total number of set bits in both words is 28 bits. Since horizontal depletion will leave at most 16 set bits in each word and since only one of two vertically adjacent words will be subject to vertical depletion, the depleted word of a vertical pair of words can contain at most 12 set bits. That is, in the case wherein the word subject to vertical depletion has 16 set bits, 4 need to be depleted. Pursuant to horizontal depletion, the set bits of word subject to vertical depletion will for the most part be separated by intervening 0's. However, the specific pattern is not known. It could be 10101 . . . or 01010 . . . Accordingly, a bit preserving MASK pattern includes 4 pairs of 0's which guarantees that a 0 of each pair will be successful in depleting a pixel while the other will necessarily correspond to a 0 in the word being depleted. For uniformity, the pairs of 0's are distributed across the bit preserving MASK pattern, as illustrated by MASK(1) and MASK(3) described previously. To avoid patterning, different bit preserving MASKS are utilized in a rotational manner.

The procedure of FIG. 10 tends to separate each printed pixel in a column by a non-printed pixel, but retains pixels so as to remove less than 50% of the pixels and so as to preserve the top and bottom edges of primitives. To the extent that approximately 50% pixel removal in the vertical direction is desired, all of the bit preserving MASKs could be set to all 0's so as to effectively remove the effect of the MASKs. Alternatively, the step at 669 could be changed to M←M'.

Resolution Up Scaling

Figure 11:
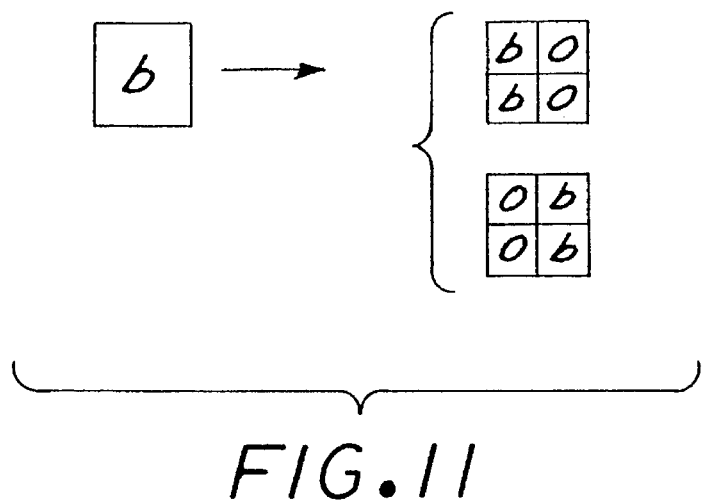
FIG. 11 schematically illustrates raster upscaling for one bit of original raster data.

Resolution expansion in accordance with the invention maps raster data at an original resolution to a higher resolution having twice the resolution in each axis (e.g., 300 dpi to 600 dpi). In particular, each of the original resolution raster data bits is mapped into a 2×2 bit cell of higher resolution pixels that has the same area as a pixel of the original resolution. In accordance with the invention, two vertically adjacent bits are each assigned the value of the original pixel bit while the remaining two vertically aligned bits in the 2×2 bit cell are 0's, with such predetermined bit location being the same for all bit cells. For the particular illustrative example of 300 dpi to 600 dpi up scaling, each 300 dpi pixel bit is mapped into a 2×2 bit cell, and the vertically adjacent bits in each cell that are controlled by the corresponding 300 dpi pixel can be the left or right side of the cell as shown in FIG. 11 for a 300 dpi pixel bit b. As also shown in FIG. 11, the remaining vertically adjacent bits of the 2×2 cells are set to 0's.

Resolution up scaled data resulting from the resolution up scaling of the invention will not be horizontally depleted when processed in accordance with the previously described enhanced mode depletion, and is readily inserted into rasterized data having the higher resolution.

Figure 12:
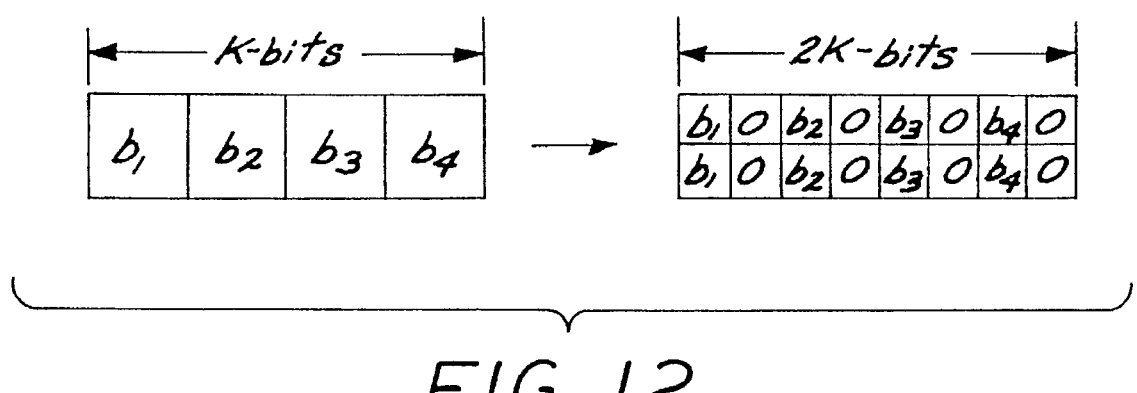
FIG. 12 schematically illustrates raster upscaling for a word of original raster data.

By way of illustrative example, raster up scaling in accordance with the invention can be performed by organizing each row of the original raster data as a series of K-bit words W(R,C), for example in the same manner as discussed earlier relative to horizontal depletion by look-up table and schematically depicted in FIG. 6, and forming for each word of the original raster data a (2*K)-bit upscaled word that contains the top bits of the cells that are set to the contents of the bits of the originating original resolution word W(R,C). The upscaled (2*K)-bit word is conveniently retrieved from a scaling look-up table that is accessed by an index I comprised of the composite binary value of the original raster data word W(R,C). The up-scaled (2*K)-bit words are then copied to the underlying row. In other words, data for the rows of the up scaled raster data that correspond to the top rows of the expanded bit cells is retrieved from the scaling look-up table, while the data for the rows of the upscaled raster data that contain the bottom rows of the expanded bit cells is copied from the overlying expanded data rows. FIG. 12 schematically depicts by way of illustrative example the up scaling of a 4-bit word, containing bits $b_1$, $b_2$, $b_3$, $b_4$, to an 8-bit word and an underlying 8-bit word of all 0's.

Figure 13:
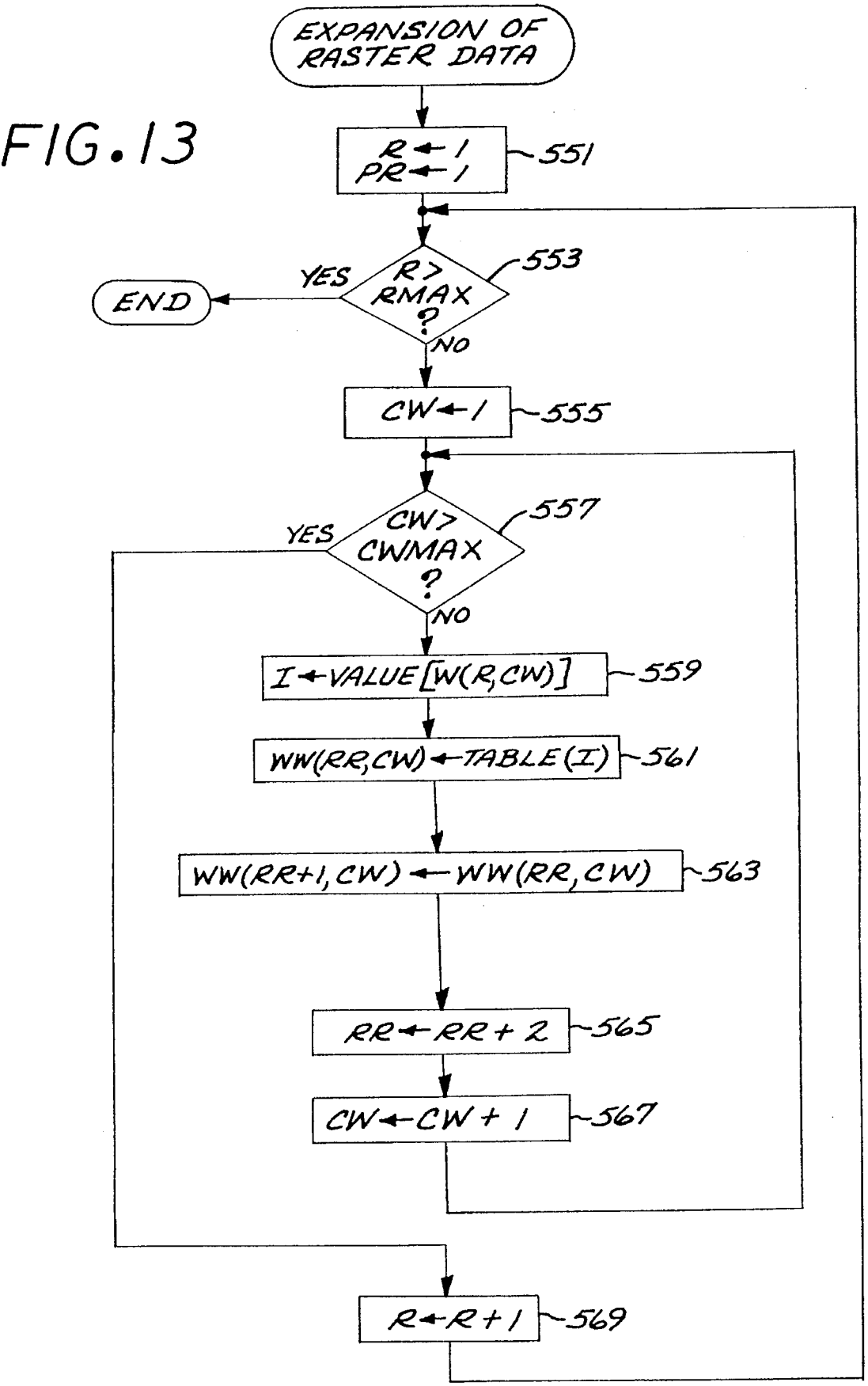
FIG. 13 sets forth a flow diagram for raster upscaling which performed by use of a scaling look-up table

Referring now to FIG. 13, set forth therein by way of illustrative example is a flow diagram of a procedure for up scaling in accordance with the invention An original raster data array having K-bit words arranged in a word array of RMAX rows and CWMAX columns is upscaled to an upscaled word array containing (2*K)-bit words WW(RR, CW) arranged in an upscaled word array of 2*RMAX rows and CWMAX columns. At 551 a row index R for the original lower resolution raster data is initialized to 1, and a row index RR for the higher resolution raster data is initialized to 1. At 553 a determination is made as to whether the row index R has exceeded the number of rows RMAX in the originating lower resolution raster data array. If the determination is no, the row index R has not exceeded the number of rows RMAX, at 555 a word array column index CW is initialized to 1. At 557 a determination is made as to whether the word array column index CW has exceeded the number of word columns CWMAX. If no, at 559 the index I to the depleter look-up table is formed of the composite binary value of the K-bit word W(R,CW). At 561 the word WW(RR, CW) in the upscaled raster data array is replaced with the (2*K)-bit word retrieved by accessing the scaling look-up table with the index I, and at 563 the upscaled word WW(RR,CW) is copied into the underlying word WW(RR+1,CW) in the upscaled raster data array. At 565 the row index RR for the up scaled raster data array is incremented by 2. At 567 the word column index CW in incremented by one and control transfers to 557.

If the determination at 557 is yes, the word column index CW has exceeded the number of word columns CWMAX, control transfers to 569 where the row count R is incremented by one. Control then transfers to 553 where the row index R is checked to determine whether it has exceeded the number of rows RMAX in the original lower resolution raster data array. If the determination at 553 is yes, the row index R has exceeded the number of rows RMAX, the procedure ends.

Increased Resolution Printing Along Media Axis

In accordance with this aspect of the disclosure, an ink jet nozzle array having a nozzle pitch along the media axis that corresponds to a particular resolution (e.g., 1/300th of an inch for 300 dpi) is utilized to print on a grid having twice the resolution (i.e., 600 dpi which has resolution grid pitch of a 1/600th of an inch for the example of a nozzle pitch of 1/300th of an inch). Pursuant to increased resolution printing, the rows of a pixel array are printed in an interleaved manner wherein each row is printed on a different carriage scan than each of any adjacent rows.

By way of simplified example, the table of FIG. 14 identifies the pixel rows that are printed pursuant to a series of carriage scans of a four nozzle array having a dot pitch that is twice the dot pitch of the printed pixel array. The vertical axis identifies the row in the pixel array, and the horizontal axis identifies the scan of the carriage. An X at a particular location indicates that the pixel row indicated by the vertical axis is printed on the carriage scan identified by the horizontal axis. A circled pixel row number indicates that such row is printed by the nozzle that is first encountered by the media, and is useful in understanding the media advance procedure.

From the table of FIG. 14, it should be appreciated that the rows printed on each scan of the carriage are as follows:

| | |
|---|---|
| Scan 1: | 1, 3 |
| Scan 2: | 2, 4, 6, 8 |
| Scan 3: | 5, 7, 9, 11 |
| Scan 4: | 10, 12, 14, 16 |

For the particular example illustrated by the table of FIG. 14, the nozzle array is initially positioned so that on the first pass one-half of the nozzles print alternating rows starting with the first row. The media is advanced by 5 dot pitches for the second pass, 3 dot pitches for the third pass, 5 dot pitches for the next, and so forth.

More generally, for a nozzle array having N nozzles adjacent to each other along the media axis and spaced apart along the media axis by a nozzle pitch P, for the first carriage scan the media is advanced to align the leading M nozzles of the nozzle array with pixel row 1 and succeeding alternating pixels rows through the (2M−1)th pixel row, wherein pitch of the pixel rows along the media axis is P/2 and wherein the M leading nozzles are nozzles first encountered by the advance of the media and M is less than or equal to N. For the second and subsequent carriage scans, the media is advanced by 2(N−M)+1 pixel rows and 2M−1 pixel rows in an alternating manner.

Figure 15:
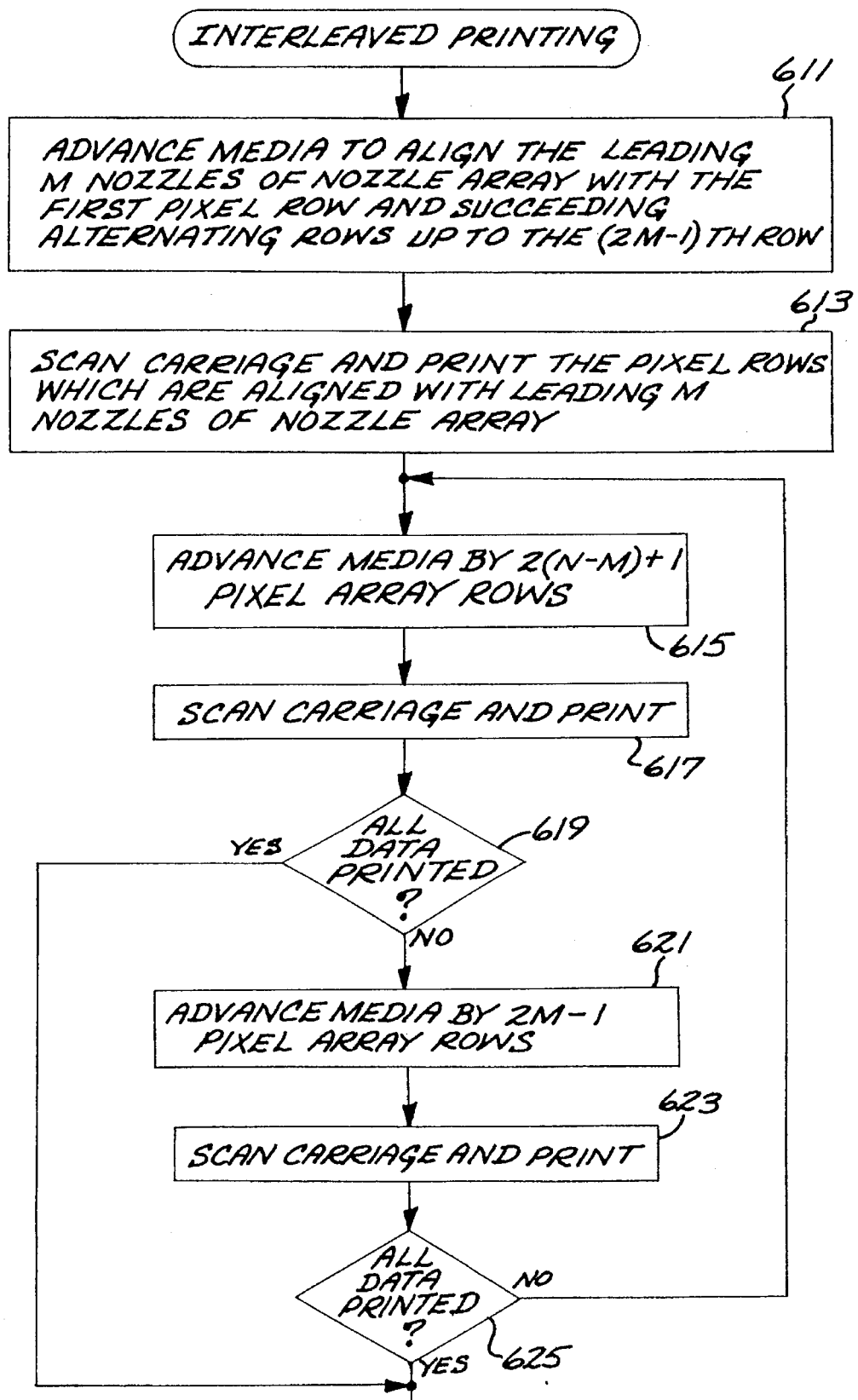
FIG. 15 sets forth a flow diagram of a printing procedure for printing a pixel array with a nozzle array having a nozzle pitch that is twice the row pitch of the pixel array.

Referring now to FIG. 15 set forth therein by way of illustrative example of increased resolution printing in accordance with the invention. At 611, the print media is advanced to align the leading M nozzles with the first pixel row and succeeding alternating pixel rows up to the (2M−1)th pixel row. At 613, the carriage scanned to print the pixel rows aligned with the leading M nozzles. At 615 the print media is advanced 2(N−M)+1 pixels rows, and at 617 the carriage is scanned to print pixel rows aligned with the nozzles of the nozzle array. At 619 a determination is made as to whether all of the raster data has been printed. If yes, the procedure ends.

If the determination at 619 is no, all the raster data has not been printed, at 621 the print media is advanced by 2M−1 pixel rows, and at 623 the carriage is scanned to print pixel rows aligned with the nozzles of the nozzle array. At 625 a determination is made as to whether all of the raster data has been printed. If yes, the procedure ends. If the determination at 625 is no, all the raster data has not been printed, control transfers to 615.

Although the foregoing has been a description and illustration of specific embodiments of the invention, various modifications and changes thereto can be made by persons skilled in the art without departing from the scope and spirit of the invention as defined by the following claims.

What is claimed is:

1. In a swath type printer having a movable carriage for supporting a plurality of print elements which are controlled to print dots on a rectilinear array of pixels each having an associated pixel data bit in a bit-mapped pixel data array which is logically organized in rows and columns to correspond to the printed pixel array, each row of the pixel data array being organized into a sequence of bits that starts at a start bit and ends with a last bit, a method for depleting a row of the pixel data array, comprising the steps of:

(A) sequentially selecting the second through next to last in sequence bit of the row of raster data; and (B) setting the selected bit to 0 if (a) the adjacent prior in sequence bit of the row is a 1 and (b) the adjacent next in sequence bit of the row is at 1.

2. In a swath type printer having a movable carriage for supporting a plurality of print elements which are controlled to print dots on a rectilinear array of pixels each having an associated pixel data bit in a bit-mapped pixel data array which is logically organized in rows and columns to correspond to the printed pixel array, each row being organized into non-overlapping immediately adjacent K-bit words which are in a column sequence that starts at a start word and ends with a last word, a method for depleting a row of the pixel data array, comprising the steps of:

(A) sequentially selecting the first through last in sequence K-bit word in the row;

(B) forming an index of K+2 bits comprised of the selected K-bit word, a bit that is immediately adjacent the selected K-bit word and contained in an immediately prior in sequence K-bit word, and a second additional bit that is immediately adjacent the selected K-bit word and contained in an immediately next in sequence K-bit word, except for the first in sequence word in a row for which the first additional bit is a 0 and except for the last in sequence K-bit word for which the second additional bit is a 0;

(C) accessing a depleter look-up table with the index for the selected K-bit word to obtain a replacement K-bit word; and (D) replacing the selected K-bit word with the replacement K-bit word, whereby all K-bit words in the pixel data array are replaced with K-bit words retrieved from the look-up table.

3. In a swath type printer having a movable carriage for supporting a plurality of print elements which are controlled to print dots on a rectilinear array of pixels each having an associated pixel data bit in a bit-mapped pixel data array which is logically organized in rows and columns to correspond to the printed pixel array, the rows being organized in a sequence that starts with a starting row and ends with an ending row, each row of the pixel data array being organized into non-overlapping immediately adjacent K-bit words, a method for depleting a row of the pixel data array, comprising the steps of:

(A) providing a depletion mask for each word having at least a predetermined number of 1's, wherein the depletion mask comprises one of the following:

(1) the adjacent word in the immediately prior row if the row being depleted is the end row;

(2) the adjacent word in the immediately next row if the binary 1's complement of the result of binary bitwise exclusive-ORing the word with an adjacent word in a prior in sequence row is 0;

(3) the result of bitwise binary ANDing of an adjacent word in the immediately prior row with an adjacent word in the immediately next row if the binary 1's complement of the result of binary bitwise exclusive-ORing the word with an adjacent word in a prior in sequence row is not 0;

(B) for each word that contains at least the predetermined minimum number of 1's, bitwise binary ORing the binary 1's complement of the depletion mask associated therewith with a bit preserving mask to produce a modified depletion mask associated with the word;

(C) for each word that contains at least the predetermined minimum number of 1's, replacing the word with a result of bitwise binary ANDing the word with the modified depletion mask associated with the word to replace the word with a depleted word.

4. In a swath type printer having a movable carriage for supporting a plurality of print elements which are controlled to print dots on a rectilinear array of pixels each having an associated pixel data bit in a bit-mapped pixel data array which is logically organized in rows and columns to correspond to the printed pixel array, the rows being organized in a sequence that starts with a starting row and ends with an ending row, each row of the pixel data array being organized into non-overlapping immediately adjacent K-bit words, a method for depleting a row of the pixel data array, comprising the steps of:

(A) providing a depletion mask for each word having at least a predetermined number of 1's, wherein the depletion mask comprises one of the following:

(1) the adjacent word in the immediately prior row if the row being depleted is the end row;

(2) the adjacent word in the immediately next row if the binary 1's complement of the result of binary bitwise exclusive-ORing the word with an adjacent word in a prior in sequence row is 0;

(3) the result of bitwise binary ANDing of an adjacent word in the immediately prior row with an adjacent word in the immediately next row if the binary 1's complement of the result of binary bitwise exclusive-ORing the word with an adjacent word in a prior in sequence row is not 0;

(B) for each word that contains at least the predetermined minimum number of 1's, replacing the word with a result of bitwise binary ANDing the word with the binary 1's complement of the depletion mask associated with the word, so as to replace the word with a depleted word.

5. In a swath type printer having a movable carriage for supporting a plurality of print elements which are controlled to print dots on a rectilinear array of pixels each having an associated pixel data bit in a bit-mapped pixel data array which is logically organized in rows and columns to correspond to the printed pixel array, the rows being organized in a sequence that starts with a starting row and ends with an ending row, each row of the pixel data array being organized into non-overlapping immediately adjacent K-bit words, a method for depleting a row of the pixel data array, comprising the steps of:

(A) providing a depletion mask for each word having at least a predetermined number of 1's, wherein the depletion mask comprises one of the following:

(1) the adjacent word in the immediately prior row if the row being depleted is the end row;

(2) the result of bitwise binary ANDing of an adjacent word in the immediately prior row with an adjacent word in the immediately next row if the row being depleted is not the end row;

(B) for each word that contains at least the predetermined minimum number of 1's, replacing the word with a result of bitwise binary ANDing the word with the binary 1's complement of the depletion mask associated with the word so as to replace the word with a depleted word.

6. In a swath type printer having a movable carriage for supporting a plurality of print elements which are controlled to print dots on a rectilinear array of pixels each having an associated pixel data bit in a bit-mapped pixel data array which is logically organized in rows and columns to correspond to the printed pixel array, the rows being organized in a sequence that starts with a starting row and ends with an ending row, each row of the pixel data array being organized into non-overlapping immediately adjacent K-bit words, a method for sequentially depleting each row of the pixel data array starting with the starting row, comprising the steps of:

(A) horizontally depleting the row to provide a horizontally depleted row wherein bits at ends of a horizontal run of bits that are 1's are preserved while interior bits of a horizontal run are separated from each other by at least one bit that is 0, except as to a horizontal run having an even number of bits in which case a bit adjacent an end bit of the horizontal run remains 1;

(B) providing a depletion mask for each word having at least a predetermined number of 1's, wherein the depletion mask comprises one of the following:

(1) the adjacent word in the immediately prior row if the row being depleted is the end row;

(2) the adjacent word in the immediately next row if the binary 1's complement of the result of binary bitwise exclusive-ORing the word with an adjacent word in a prior in sequence row is 0;

(3) the result of bitwise binary ANDing of an adjacent word in the immediately prior row with an adjacent word in the immediately next row if the binary 1's complement of the result of binary bitwise exclusive-ORing the word with an adjacent word in a prior in sequence row is not 0;

(C) for each word that contains at least the predetermined minimum number of 1's, bitwise binary ORing the binary 1's complement of the depletion mask associated therewith with a bit preserving mask to produce a modified depletion mask associated with the word;

(D) for each word that contains at least the predetermined minimum number of 1's, replacing the word with a result of bitwise binary ANDing the word with the modified depletion mask associated with the word, so as to replace the word with a depleted word.

7. The method of claim 6 wherein different K-bit bit preserving masks are utilized for K-bit words that are adjacent in a same column.

8. In a swath type printer having a movable carriage for supporting a plurality of print elements which are controlled to print dots on a rectilinear array of pixels each having an associated pixel data bit in a bit-mapped pixel data array which is logically organized in rows and columns to correspond to the printed pixel array, the rows being organized in a sequence that starts with a starting row and ends with an ending row, each row of the pixel data array being organized into non-overlapping immediately adjacent K-bit words, a method for sequentially depleting each row of the pixel data array starting with the starting row, comprising the steps of:

(A) horizontally depleting the row to provide a horizontally depleted row wherein bits at ends of a horizontal run of bits that are 1's are preserved while interior bits of a horizontal run are separated from each other by at least one bit that is 0, except as to a horizontal run having an even number of bits in which case a bit adjacent an end bit of the horizontal run remains 1;

(B) performing steps (C) through (E) only for alternating rows of the pixel data array;

(C) providing a depletion mask for each word having at least a predetermined number of 1's, wherein the depletion mask comprises one of the following:
(1) the adjacent word in the immediately prior row if the row being depleted is the end row;
(2) the adjacent word in the immediately next row if the binary 1's complement of the result of binary bitwise exclusive-ORing the word with an adjacent word in a prior in sequence row is 0;
(3) the result of bitwise binary ANDing of an adjacent word in the immediately prior row with an adjacent word in the immediately next row if the binary 1's complement of the result of binary bitwise exclusive-ORing the word with an adjacent word in a prior in sequence row is not 0;

(D) for each word that contains at least the predetermined minimum number of 1's, bitwise binary ORing the binary 1's complement of the depletion mask associated therewith with a bit preserving mask to produce a modified depletion mask associated with the word; and (E) for each word that contains at least the predetermined minimum number of 1's, replacing the word with a result of bitwise binary ANDing the word with the modified depletion mask associated with the word, so as to replace the word with a depleted word.

9. In a swath type printer having a movable carriage for supporting a plurality of print elements which are controlled to print dots on a rectilinear array of pixels each having an associated pixel data bit in a bit-mapped pixel data array which is logically organized in rows and columns to correspond to the printed pixel array, the rows being organized in a sequence that starts with a starting row and ends with an ending row, each row of the pixel data array being organized into non-overlapping immediately adjacent K-bit words, a method for sequentially depleting each row of the pixel data array starting with the starting row, comprising the steps of:

(A) horizontally depleting the row to provide a horizontally depleted row wherein bits at ends of a horizontal run of bits that are 1's are preserved while interior bits of a horizontal run are separated from each other by at least one bit that is 0, except as to a horizontal run having an even number of bits in which case a bit adjacent an end bit of the horizontal run remains 1;

(B) providing a depletion mask for each word having at least a predetermined number of 1's, wherein the depletion mask comprises one of the following:
(1) the adjacent word in the immediately prior row if the row being depleted is the end row;
(2) the adjacent word in the immediately next row if the binary 1's complement of the result of binary bitwise exclusive-ORing the word with an adjacent word in a prior in sequence row is 0;
(3) the result of bitwise binary ANDing of an adjacent word in the immediately prior row with an adjacent word in the immediately next row if the binary 1's complement of the result of binary bitwise exclusive-ORing the word with an adjacent word in a prior in sequence row is not 0;

(C) for each word that contains at least the predetermined minimum number of 1's, replacing the word with a result of bitwise binary ANDing the word with the binary 1's complement of the depletion mask associated with the word, so as to replace the word with a depleted word.

10. In a swath type printer having a movable carriage for supporting a plurality of print elements which are controlled to print dots on a rectilinear array of pixels each having an associated pixel data bit in a bit-mapped pixel data array which is logically organized in rows and columns to correspond to the printed pixel array, the rows being organized in a sequence that starts with a starting row and ends with an ending row, each row of the pixel data array being organized into non-overlapping immediately adjacent K-bit words, a method for sequentially depleting each row of the pixel data array starting with the starting row, comprising the steps of:

(A) horizontally depleting the row to provide a horizontally depleted row wherein bits at ends of a horizontal run of bits that are 1's are preserved while interior bits of a horizontal run are separated from each other by at least one bit that is 0, except as to a horizontal run that having an even number of bits in which case a bit adjacent an end bit of the horizontal run is remains 1;

(B) providing a depletion mask for each word having at least a predetermined number of 1's, wherein the depletion mask comprises one of the following:
(1) the adjacent word in the immediately prior row if the row being depleted is the end row;
(2) the result of bitwise binary ANDing of an adjacent word in the immediately prior row with an adjacent word in the immediately next row if the row being depleted is not the end row;

(C) for each word that contains at least the predetermined minimum number of 1's, replacing the word with a result of bitwise binary ANDing the word with the binary 1's complement of the depletion mask associated with the word, so as to replace the word with a depleted word.

11. In a swath type printer having a movable carriage for supporting a plurality of print elements which are controlled to print dots on a rectilinear array of pixels, a method for upscaling a first bit-mapped pixel data array logically organized in rows and columns to a second bit-mapped pixel data array logically arranged in rows and columns, wherein the resolution of the second bit-mapped pixel data array along each of the row and column axes is twice that of the first bit-mapped pixel data array, comprising the steps of:

(A) allocating a four-bit cell in the second array for each bit in the first array, wherein the four-bit cell is comprised of four bits logically arranged in two rows and two columns, such that four-bit cells in the second array are logically organized in rows and columns in the same manner as corresponding bits in the first array;

(B) for each four-bit cell, setting both bits at a predetermined column location within the cell that is the same for all four-bit cells to the contents of the corresponding bits in the first pixel array; and (C) for each four-bit cell, setting the bits in the other column of the bit cell to 0.

* * * * *